United States Patent
Yoshida et al.

(10) Patent No.: US 7,371,790 B2
(45) Date of Patent: May 13, 2008

(54) POLYPHENYLENE ETHER COMPOSITION

(75) Inventors: Kazuo Yoshida, Sodegaura (JP);
Junichi Nakahashi, Kimitsu (JP);
Tadayuki Ishii, Futtsu (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/489,298

(22) PCT Filed: Aug. 30, 2002

(86) PCT No.: PCT/JP02/08810

§ 371 (c)(1),
(2), (4) Date: Mar. 11, 2004

(87) PCT Pub. No.: WO03/025064

PCT Pub. Date: Mar. 27, 2003

(65) Prior Publication Data

US 2004/0235993 A1    Nov. 25, 2004

(30) Foreign Application Priority Data

Sep. 14, 2001 (JP) .............................. 2001-279034
Sep. 14, 2001 (JP) .............................. 2001-279035

(51) Int. Cl.
*C08K 5/523* (2006.01)
(52) U.S. Cl. ................................. 524/127
(58) Field of Classification Search ................ 524/127
See application file for complete search history.

(56) References Cited

U.S. PATENT DOCUMENTS

| | | | |
|---|---|---|---|
| 4,145,377 A | | 3/1979 | Bussink et al. |
| 4,945,018 A | * | 7/1990 | Abolins et al. ............. 524/141 |
| 5,397,822 A | * | 3/1995 | Lee, Jr. ...................... 524/127 |
| 5,461,096 A | | 10/1995 | Bopp et al. ................. 524/145 |
| 6,028,130 A | * | 2/2000 | Weber et al. ............... 524/126 |
| 6,414,084 B1 | * | 7/2002 | Adedeji ...................... 525/133 |

FOREIGN PATENT DOCUMENTS

| | | | |
|---|---|---|---|
| EP | 0362660 B1 | | 4/1990 |
| EP | 0719832 A2 | | 7/1996 |
| GB | 2043083 | * | 1/1980 |
| GB | 2043083 A | | 10/1980 |
| JP | 07-053876 | * | 2/1995 |
| JP | 07-331085 | * | 11/1995 |
| JP | 11-012457 | * | 1/1999 |
| JP | 2000-26717 A | | 1/2000 |
| JP | 2001-139798 | * | 5/2001 |
| JP | 2001-187843 | * | 7/2001 |

OTHER PUBLICATIONS

English language translation of JP 11-012457 (Jan. 19, 1999).
English language translation of JP 2001-139798 (May 22, 2001).
English language translation of JP 07-053876 (Feb. 28, 1995).
English language translation of JP 2001-187843 (Jul. 10, 2001).
English language translation of JP 07-331085 (Dec. 19, 1995).

* cited by examiner

*Primary Examiner*—Peter Szekely
(74) *Attorney, Agent, or Firm*—Birch, Stewart, Kolasch & Birch, LLP

(57) ABSTRACT

A polyphenylene ether composition comprising: 100 parts by weight of (A) a polyphenylene ether resin or a combination of a polyphenylene ether resin and a styrene resin; 1 to 40 parts by weight of (B) a flame retardant which is comprised mainly of at least one member selected from the group consisting of two specific condensed phosphoric esters; 0.3 to 10 parts by weight of (C) a hydrogenated block copolymer which is defined as a hydrogenation product of a block copolymer comprising a polymerized styrene block and a polymerized conjugated diene block, wherein at least one polymerized styrene block has a number average molecular weight of 15,000 or more; and 0.3 to 10 parts by weight of (D) a polyolefin resin, wherein the weight ratio of the component (C) to the component (D) is from 70/30 to 15/85.

8 Claims, No Drawings

POLYPHENYLENE ETHER COMPOSITION

BACKGROUND OF THE INVENTION

1. Field of the Invention

The present invention relates to a polyphenylene ether composition which not only has excellent flame retardancy and excellent impact resistance, but also is friendly to the environment. More particularly, the present invention is concerned with a polyphenylene ether composition comprising: 100 parts by weight of (A) a polyphenylene ether resin or a combination of a polyphenylene ether resin and a styrene resin; 1 to 40 parts by weight of (B) a flame retardant which is comprised mainly of at least one member selected from the group consisting of two specific types of condensed phosphoric esters; 0.3 to 10 parts by weight of (C) a hydrogenated block copolymer which is defined as a hydrogenation product of a block copolymer comprising a polymerized styrene block and a polymerized conjugated diene block, wherein at least one polymerized styrene block has a number average molecular weight of 15,000 or more; and 0.3 to 10 parts by weight of (D) a polyolefin resin, wherein the weight ratio of the component (C) to the component (D) is from 70/30 to 15/85. The polyphenylene ether composition of the present invention is friendly to the environment because the polyphenylene ether composition contains neither a halogen compound nor an antimony compound as a flame retardant. Also, the polyphenylene ether composition retains good heat resistance, mechanical characteristics and dielectric properties which are inherently possessed by a polyphenylene ether resin. Further, the polyphenylene ether composition of the present invention, in the injection molding thereof, exhibits excellent mold release characteristics and is substantially free from generation of a gas and from adhesion of the flame retardant to the mold, so that the molding cycle time of the polyphenylene ether composition can be shortened. Furthermore, the polyphenylene ether composition also exhibits excellent chemical resistance and excellent impact resistance.

2. Prior Art

Conventionally, as a method for imparting flame retardancy to a flammable synthetic resin, a method has been employed in which a halogen compound or a combination of a halogen compound and antimony trioxide is added to a flammable synthetic resin to obtain a flame retardant resin. However, this method is disadvantageous from the viewpoint of environmental hygiene since, when the flame retardant resin is burned, a poisonous gas is generated. Therefore, it has been desired to improve the above-mentioned method for imparting flame retardancy to a flammable synthetic resin.

With respect to each of a polyphenylene ether resin and a mixed resin comprising a polyphenylene ether resin and a styrene resin (hereinafter, this mixed resin is frequently referred to as a "PPE/styrene resin"), flame retardancy can be imparted to the resin by incorporating thereinto an organic phosphoric ester instead of a halogen compound and antimony trioxide. Examples of organic phosphoric esters include a monophosphoric ester, such as triphenyl phosphate, cresyldiphenyl phosphate or tricresyl phosphate, and a condensed phosphoric ester which is produced using as a raw material a polyhydric phenol (especially a dihydric phenol, such as resorcinol or bisphenol A). It is generally said that the above-mentioned organic phosphoric esters do not adversely affect the environmental hygiene as compared to the case of the halogen compounds. It is also said that a resin composition containing a condensed phosphoric ester is better than a resin composition containing a monophosphoric ester in that the resin composition containing a condensed phosphoric ester, in the injection molding thereof, has excellent heat resistance and is relatively free from generation of a gas and from adhesion of the flame retardant contained therein to the mold, so that there is a growing demand for a resin composition containing a condensed phosphoric ester.

However, the above-mentioned resin composition containing a condensed phosphoric ester has disadvantages. For example, although the resin composition containing a condensed phosphoric ester has improved properties related to stiffness, such as tensile strength, flexural strength and flexural modulus, as compared to those of the resin composition containing a monophosphoric ester, the resin composition containing a condensed phosphoric ester does not retain a good impact resistance which is inherently possessed by the polyphenylene resin, so that the resin composition is likely to suffer cracking. Further, with respect to the improvement of flame retardancy, a condensed phosphoric ester is less effective than a monophosphoric ester. Therefore, it is necessary to use a condensed phosphoric ester in a large amount as compared to the case of a monophosphoric ester. However, when the resin composition contains a large amount of a condensed phosphoric ester, the impact resistance of the resin composition becomes further lowered. Therefore, it is necessary to prevent the impact resistance of the resin composition from lowering. For this purpose, for example, a large amount of an elastomer is incorporated into the resin composition. As an elastomer used for improving the impact resistance of a PPE/styrene resin, a hydrogenated block copolymer having excellent heat stability is generally used. However, for satisfactorily improving the impact resistance of the PPE/styrene resin, it is necessary to use the hydrogenated block copolymer in a large amount. However, the use of a large amount of the hydrogenated block copolymer is disadvantageous not only in that the flame retardancy of the PPE/styrene resin is lowered, but also in that the use of the hydrogenated block copolymer which is expensive is uneconomical.

As a conventional method for further improving the impact resistance of a PPE/styrene resin composition (i.e., composition comprising not only a polyphenylene ether resin and a styrene resin, but also another component, such as a condensed phosphoric ester), there can be mentioned methods using a hydrogenated block copolymer in combination with a polyolefin resin, which are disclosed, for example, in U.S. Pat. Nos. 4,145,377, 4,166,055 and 4,383,082, Unexamined Japanese Patent Application Laid-Open Specification No. Sho 56-51356, Unexamined Japanese Patent Application Laid-Open Specification No. Sho 62-179561, Unexamined Japanese Patent Application Laid-Open Specification No. Hei 2-169665 (corresponding to EP 0 362 660), Unexamined Japanese Patent Application Laid-Open Specification No. Hei 4-7357 (corresponding to U.S. Pat. No. 5,296,540), Unexamined Japanese Patent Application Laid-Open Specification No. Hei 4-279697 (corresponding to U.S. Pat. No. 5,296,540) and Unexamined Japanese Patent Application Laid-Open Specification No. Hei 6-192561. However, the conventional techniques disclosed in the above-mentioned patent documents are not concerned with a flame retardant resin composition containing a condensed phosphoric ester as a flame retardant, that is, use of these conventional techniques is not intended with respect to the resin compositions having flame retardancy. Therefore, the objects of the inventions of the above-mentioned patent documents are different from that of the present invention, and the amounts of a hydrogenated block copolymer and a polyolefin resin used in the above-mentioned patent documents are large as compared to those used in the present invention. Generally, the more the amounts of a hydrogenated block copolymer and a polyolefin resin, the more improved the impact resistance of the resin composition, but the more lowered the flame retardancy of the resin composition. For improving the impact resistance of a flame retardant resin composition containing a condensed phosphoric ester as a flame retardant (wherein the resin composition has poor impact resistance), Unexamined Japanese Patent Application Laid-Open Specification No. Hei 09-151315 attempts to incorporate a grafted copolymer into the resin composition, wherein the grafted copolymer is obtained by grafting a hybrid rubber onto a polyorganosiloxane as a base polymer. In this case, the impact resistance of the resin composition can be improved without lowering the flame retardancy of the resin composition. However, the grafted copolymer used for improving the impact resistance of the resin composition is expensive and, hence, the use of such a grafted copolymer is economically disadvantageous.

A PPE/styrene resin composition containing a phosphoric ester having high acid value is susceptible to absorption of water and hydrolysis. By the hydrolysis of the PPE/styrene resin composition, the dielectric properties (i.e., dielectric constant and dielectric loss tangent) of the PPE/styrene resin composition are lowered.

The molding of a PPE/styrene resin composition (especially a flame retardant PPE/styrene resin composition containing a flame retardant) is frequently conducted by injection molding. In this case, there is a problem in that a shaped article obtained by the injection molding exhibits poor releasability from the mold. It has been desired to improve the releasability of the shaped article from the mold in the injection molding.

SUMMARY OF THE INVENTION

In this situation, the present inventors have made extensive and intensive studies with a view toward developing a technique for solving the above-mentioned problems accompanying the prior art. As a result, it has unexpectedly been found that the above-mentioned problems can be solved by incorporating a specific hydrogenated block copolymer and a specific polyolefin resin in a specific ratio to a flame retardant resin comprising a polyphenylene ether resin and a condensed phosphoric ester. Based on this finding, the present invention has been completed.

Accordingly, it is an object of the present invention to provide a flame retardant polyphenylene ether resin composition which not only contains no halogen compound (and, hence, is friendly to the environment) and has excellent properties with respect to heat resistance, mechanical characteristics and electrical characteristics (such as dielectric properties), but also, in the injection molding thereof, exhibits excellent mold release characteristics and is substantially free from generation of a gas and from adhesion of the flame retardant contained therein to the mold, as well as has excellent impact resistance.

The foregoing and other objects, features and advantages of the present invention will be apparent from the following detailed description and appended claims.

DETAILED DESCRIPTION OF THE INVENTION

According to the present invention, there is provided a polyphenylene ether composition comprising:

100 parts by weight of (A) a polyphenylene ether resin or a combination of a polyphenylene ether resin and a styrene resin, 1 to 40 parts by weight of (B) a flame retardant which is comprised mainly of at least one member selected from the group consisting of a condensed phosphoric ester (I) and a condensed phosphoric ester (II), respectively, represented by the following formulae (I) and (II):

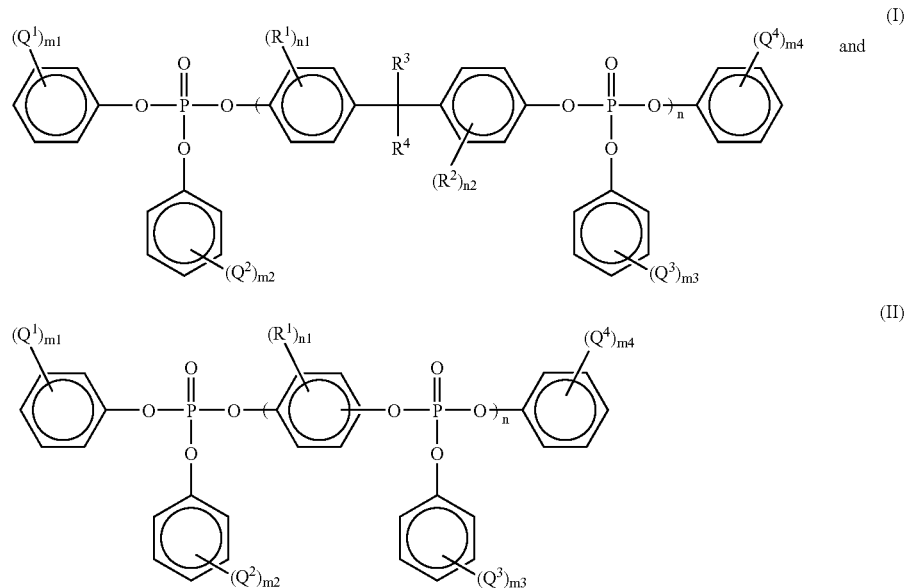

wherein each of $Q^1$, $Q^2$, $Q^3$ and $Q^4$ is a substituent and independently represents an alkyl group having 1 to 6 carbon atoms; each of $R^1$ and $R^2$ is a substituent and represents a methyl group; each of $R^3$ and $R^4$ independently represents a hydrogen atom or a methyl group; n has an average value of 1 or more; each of n1 and n2 independently represents an integer of from 0 to 2; and each of m1, m2, m3 and m4 independently represents an integer of from 0 to 3, 0.3 to 10 parts by weight of (C) a hydrogenated block copolymer which is defined as a hydrogenation product of a block copolymer comprising a polymerized styrene block and a polymerized conjugated diene block, wherein at least one polymerized styrene block has a number average molecular weight of 15,000 or more, and 0.3 to 10 parts by weight of (D) a polyolefin resin, wherein the weight ratio of the component (C) to the component (D) is from 70/30 to 15/85.

For easy understanding of the present invention, the essential features and various preferred embodiments of the present invention are enumerated below.

1. A polyphenylene ether composition comprising:
100 parts by weight of (A) a polyphenylene ether resin or a combination of a polyphenylene ether resin and a styrene resin,
1 to 40 parts by weight of (B) a flame retardant which is comprised mainly of at least one member selected from the group consisting of a condensed phosphoric ester (I) and a condensed phosphoric ester (II), respectively, represented by the following formulae (I) and (II):

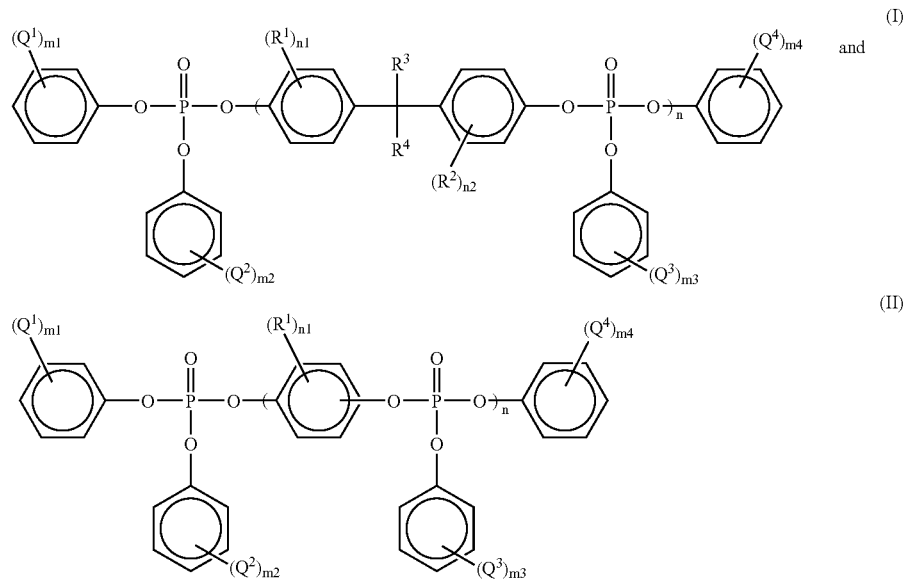

wherein each of $Q^1$, $Q^2$, $Q^3$ and $Q^4$ is a substituent and independently represents an alkyl group having 1 to 6 carbon atoms; each of $R^1$ and $R^2$ is a substituent and represents a methyl group; each of $R^3$ and $R^4$ independently. represents a hydrogen atom or a methyl group; n has an average value of 1 or more; each of n1 and n2 independently represents an integer of from 0 to 2; and each of m1, m2, m3 and m4 independently represents an integer of from 0 to 3, 0.3 to 10 parts by weight of (C) a hydrogenated block copolymer which is defined as a hydrogenation product of a block copolymer comprising a polymerized styrene block and a polymerized conjugated diene block, wherein at least one polymerized styrene block has a number average molecular weight of 15,000 or more, and 0.3 to 10 parts by weight of (D) a polyolefin resin, wherein the weight ratio of the component (C) to the component (D) is from 70/30 to 15/85.

2. The polyphenylene ether composition according to item 1 above, wherein the flame retardant (B) is comprised mainly of the condensed phosphoric ester (I).

3. The polyphenylene ether composition according to item 1 above, wherein the flame retardant (B) is comprised mainly of the condensed phosphoric ester (I), which has an acid value of 0.1 or less.

4. The polyphenylene ether composition according to any one of items 1 to 3 above, wherein the amounts of the hydrogenated block copolymer (C) and the polyolefin resin (D) are, respectively, 0.5 to 3 parts by weight and 0.5 to 4 parts by weight, and wherein the weight ratio of the component (C) to the component (D) is from 60/40 to 15/85.

5. The polyphenylene ether composition according to any one of items 1 to 3 above, wherein the amounts of the hydrogenated block copolymer (C) and the polyolefin resin (D) are, respectively, 0.5 to 3 parts by weight and 0.5 to 4 parts by weight, and wherein the weight ratio of the component (C) to the component (D) is from 55/45 to 25/75.

6. The polyphenylene ether composition according to any one of items 1 to 5 above, wherein the hydrogenated block copolymer (C), in terms of a non-hydrogenated form thereof, comprises a polymerized styrene block and a polymerized butadiene block, wherein the weight ratio of the polymerized styrene block to the polymerized butadiene block is from 40/60 to 70/30.

7. The polyphenylene ether composition according to any one of items 1 to 6 above, wherein the polyolefin resin (D) is a polyethylene.

8. The polyphenylene ether composition according to any one of items 1 to 6 above, wherein the polyolefin resin (D) is a low density polyethylene.

9. The polyphenylene ether composition according to any one of items 1 to 6 above, wherein the polyolefin resin (D) is an ethylene-propylene copolymer.

10. The polyphenylene ether composition according to any one of items 1 to 9 above, wherein the polyphenylene ether resin (A) is poly(2,6-dimethyl-1,4-phenylene) ether which has an $\eta_{sp}/c$ of from 0.3 to 0.7 as measured using a chloroform solution thereof having a temperature of 30° C., and has an Mw/Mn ratio of from 2.2 to 5.0, wherein Mw is the weight average molecular weight of the poly (2,6-dimethyl-1,4-phenylene) ether and Mn is the number average molecular weight of the poly(2,6-dimethyl-1,4-phenylene) ether and wherein each of the Mw and Mn is determined by gel permeation chromatography (GPC) using a calibration curve obtained with respect to standard monodisperse polystyrene samples.

Hereinbelow, the present invention is described in detail.

The polyphenylene ether resin (A) used in the present invention is a homopolymer or a copolymer comprising recurring units each independently represented by the following formula (III) or (IV):

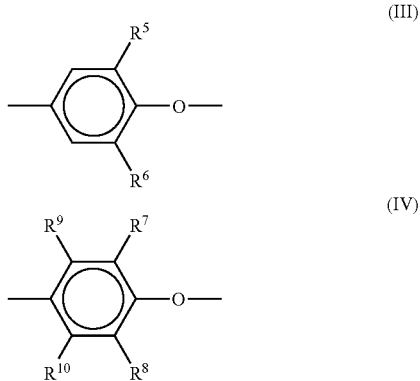

wherein each of $R^5$, $R^6$, $R^7$, $R^8$, $R^9$ and $R^{10}$ independently represents a hydrogen atom, an alkyl group having 1 to 4 carbon atoms, an aryl group having 6 to 9 carbon atoms or a halogen atom, with the proviso that $R^9$ and $R^{10}$ are not simultaneously hydrogen atoms.

Representative examples of polyphenylene ether resins which are homopolymers include poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether and poly(2-methyl-6-chloroethyl-1,4-phenylene) ether.

Of these polyphenylene ethers, poly(2,6-dimethyl-1,4-phenylene) ether is preferred. Each of the above-mentioned polyphenylene ethers may partially contain, in the main chain thereof, at least one monomer unit selected from the group consisting of a 2-dialkylaminomethyl-6-methylphenylene ether monomer unit and a 2-(N-alkyl-N-phenylaminomethyl)-6-methylphenylene ether monomer unit, wherein these monomer units are disclosed in Unexamined Japanese Patent Application Laid-Open Specification No. Sho 63-301222 and the like.

In the present invention, the polyphenylene ether copolymer means a copolymer comprised mainly of a monomer unit having a phenylene ether structure. Examples of polyphenylene ether copolymers include a copolymer obtained by copolymerizing 2,6-dimethylphenol and 2,3,6-trimethylphenol, a copolymer obtained by copolymerizing 2,6-dimethylphenol and o-cresol, and a copolymer obtained by copolymerizing 2,6-dimethylphenol, 2,3,6-trimethylphenol and o-cresol.

As an especially preferred example of a polyphenylene ether resin for practical use, there can be mentioned poly (2,6-dimethyl-1,4-phenylene) ether which has an $\eta_{sp}/c$ of from 0.3 to 0.7, preferably from 0.4 to 0.6, as measured using a chloroform solution thereof having a temperature of 30° C., and has a weight average molecular weight/number average molecular weight ratio (Mw/Mn ratio) of from 2.2 to 5.0, preferably from 2.3 to 3.5, wherein each of the weight average molecular weight and number average molecular weight of the poly(2,6-dimethyl-1,4-phenylene) ether is determined by gel permeation chromatography (GPC) using a calibration curve obtained with respect to standard monodisperse polystyrene samples. Such a polyphenylene ether is especially preferred from the viewpoint of molding fluidity.

In the polyphenylene ether composition of the present invention, as the component (A), there can be used an acid-modified polyphenylene ether resin produced by partially or completely modifying a polyphenylene ether resin with an unsaturated carboxylic acid or a derivative thereof. Such an acid-modified polyphenylene ether resin is disclosed, for example, in Unexamined Japanese Patent Application Laid-Open Specification No. Hei 2-276823 (corresponding to U.S. Pat. No. 5,159,027), Unexamined Japanese Patent Application Laid-Open Specification No. Sho 63-108059 and Unexamined Japanese Patent Application Laid-Open Specification No. Sho 59-59724. The acid-modified polyphenylene ether resin can be produced, for example, by a method in which a mixture of a polyphenylene ether resin with an unsaturated carboxylic acid or a derivative thereof is melt-kneaded in the presence or absence of a radical initiator and a reaction is effected. Alternatively, the acid-modified polyphenylene ether resin can also be produced by a method in which a polyphenylene ether resin and an unsaturated carboxylic acid or a derivative thereof are dissolved in an organic solvent in the presence or absence of a radical initiator to obtain a solution, and a reaction is effected in the solution.

Examples of unsaturated carboxylic acids and derivatives thereof include dicarboxylic acids, such as maleic acid, fumaric acid, itaconic acid, halogenated maleic acid, cis-4-cyclohexene-1,2-dicarboxylic acid and endo-cis-bicyclo(2,2,1)-5-heptene-2,3-dicarboxylic acid; anhydrides, esters, amides and imides of the above-mentioned dicarboxylic acids; monocarboxylic acids, such as acrylic acid and methacrylic acid; and esters and amides of the above-mentioned monocarboxylic acids. Further, a saturated carboxylic acid can also be used if the saturated carboxylic acid is thermally decomposed at a temperature at which the production of an acid-modified polyphenylene ether is conducted, so that the saturated carboxylic acid can be converted to an unsaturated carboxylic acid or a derivative thereof used in the present invention. Specific examples of such saturated carboxylic acids include malic acid and citric acid, which can be used individually or in combination.

In the present invention, the styrene resin used in combination with the polyphenylene ether resin means a styrene homopolymer obtained by homopolymerizing a styrene compound, or a styrene copolymer obtained by copolymerizing, in the presence or absence of a rubbery polymer, a styrene compound and a compound which is copolymerizable with the styrene compound.

When the polyphenylene ether resin and the styrene resin are used in combination, the polyphenylene ether resin/ styrene resin weight ratio is preferably in the range of from 10/90 to 99/1, more preferably from 20/80 to 90/10, still more preferably from 30/70 to 80/20.

Specific examples of styrene compounds include styrene, α-methylstyrene, 2,4-dimethylstyrene, monochlorostyrene, p-methylstyrene, p-tert-butylstyrene and ethylstyrene. Of these styrene compounds, styrene is most preferred. Examples of compounds which are copoymerizable with styrene compounds include methacrylic esters, such as methyl methacrylate and ethyl methacrylate; unsaturated nitriles, such as acrylonitrile and methacrylonitrile; and acid anhydrides, such as maleic anhydride. These copoymerizable compounds are used in combination with styrene compounds. The amount of the copolymerizable compound is preferably 20% by weight or less, more preferably 15% by weight or less, based on the total amount of the styrene compound and the compound copolymerizable therewith.

Examples of rubbery polymers which can be used in the production of a styrene copolymer include conjugated diene rubbers, conjugated diene-aromatic vinyl compound copolymers and ethylene-propylene copolymer rubbers. Polybutadiene and styrene-butadiene copolymers are especially preferred. It is also preferred to use, as a rubbery polymer, a partially hydrogenated polybutadiene having a degree of unsaturation of from 80 to 20% or a polybutadiene having a cis 1,4-bond content of 90% or more.

Specific examples of styrene resins include a polystyrene and a rubber-modified polystyrene; a styrene-acrylonitrile copolymer (AS resin) and a rubber-reinforced styrene-acrylonitrile copolymer (ABS resin); and styrene copolymers other than mentioned above. Of these styrene resins, from the viewpoint of an improved compatibility with the polyphenylene ether resin, a polystyrene and a rubber-modified polystyrene are preferred.

The flame retardant (B) used in the present invention is comprised mainly of at least one member selected from the group consisting of a condensed phosphoric ester (I) and a condensed phosphoric ester (II), respectively, represented by the following formulae (I) and (II):

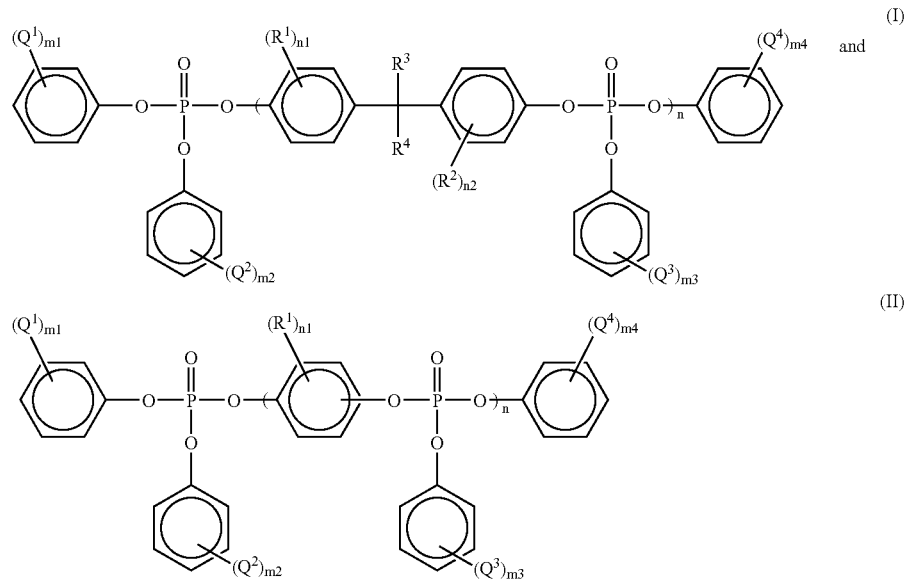

wherein each of $Q^1$, $Q^2$, $Q^3$ and $Q^4$ is a substituent and independently represents an alkyl group having 1 to 6 carbon atoms; each of $R^1$ and $R^2$ is a substituent and represents a methyl group; each of $R^3$ and $R^4$ independently represents a hydrogen atom or a methyl group; n has an average value of 1 or more; each of n1 and n2 independently represents an integer of from 0 to 2; and each of m1, m2, m3 and m4 independently represents an integer of from 0 to 3.

Each of the condensed phosphoric esters (I) and (II), respectively, represented by the above-mentioned formulae (I) and (II), is comprised of a plurality of molecular chains. In each molecular chain, n represents an integer of 1 or more, preferably from 1 to 3. In each of the condensed phosphoric esters (I) and (II), n has an average value of 1 or more.

The condensed phosphoric ester (I) is more advantageous than the condensed phosphoric ester (II) in the following points. In the melt-kneading for producing the polyphenylene ether composition of the present invention, generation of a black-colored impurity is unlikely to occur when the condensed phosphoric ester (I) is used, as compared to the case wherein the condensed phosphoric ester (II) is used. Generation of the black-colored impurity is considered to occur due to a decomposition reaction or dehydration reaction of a condensed phosphoric ester. Further, the condensed phosphoric ester (I) is advantageously low with respect to water absorption as compared to the condensed phosphoric ester (II), wherein the water absorption causes a lowering of the dielectric properties (i.e., dielectric constant and dielectric loss tangent) of the polyphenylene ether composition.

Of the above-mentioned condensed phosphoric esters, especially preferred is a specific form of condensed phosphoric ester (I) wherein each of the substituents $Q^1$, $Q^2$, $Q^3$ and $Q^4$ is a methyl group; each of m1, m2, m3 and m4 (which respectively represent the numbers of the substituents $Q^1$, $Q^2$, $Q^3$ and $Q^4$) independently represents an integer of from 0 to 3; each of n1 and n2 (which respectively represent the numbers of the substituents $R^1$ and $R^2$ each representing a methyl group) is 0; each of $R^3$ and $R^4$ represents a methyl group; and n in each condensed phosphoric ester molecular chain is from 1 to 3. In the above-mentioned specific form of condensed phosphoric ester (I), it is especially preferred that the amount of phosphoric ester chains of formula (I) in which n is 1 is 50% or more. It is preferred that the condensed phosphoric ester used in the present invention has an acid value of 0.1 or less. The acid value is measured in accordance with JIS K 2501, in which the acid value is defined as the weight (indicated by mg) of potassium hydroxide needed for neutralizing the acidic components contained in 1 g of a sample of the condensed phosphoric ester. A polyphenylene ether having incorporated therein a condensed phosphoric ester (especially the condensed phosphoric ester (I)) having an acid value of 0.1 or less has excellent dielectric properties because such a polyphenylene ether is not susceptible to hydrolysis (i.e., is not susceptible to absorption of water). When the acid value of the condensed phosphoric ester is large, the following disadvantages are likely to occur. During the molding of the polyphenylene ether composition, not only is the mold easily corroded, but also a large amount of gas is generated since the polyphenylene ether is easily decomposed. Further, the polyphenylene ether composition is susceptible to absorption of water (susceptible to hydrolysis), so that the dielectric properties of the polyphenylene ether composition are disadvantageously lowered.

In the present invention, the amount of the flame retardant (B) (which is comprised mainly of a condensed phosphoric ester) is from 1 to 40 parts by weight, preferably from 3 to 30 parts by weight, relative to 100 parts by weight of the component (A) (i.e., the polyphenylene ether resin or a combination of the polyphenylene ether resin and the styrene resin). When the amount of the flame retardant (B) is less than 1 part by weight, the polyphenylene ether composition has no flame retardancy. On the other hand, when the amount of the flame retardant (B) is more than 40 parts by weight, disadvantages are likely to occur not only in that the flame retardancy of the polyphenylene ether composition does not show any appreciable improvement over the case where the amount of the flame retardant (B) is 40 parts by weight or less, but also in that the mechanical strength and heat resistance of the polyphenylene ether composition are impaired.

The above-mentioned flame retardants are generally commercially available. Examples of commercially available flame retardants include CR-741, CR-747, CR-733S and PX-200 (trade names), each manufactured and sold by Daihachi Chemical Industry Co., Ltd., Japan.

The hydrogenated block copolymer (C) used in the present invention is defined as a hydrogenation product of a non-hydrogenated block copolymer comprising a polymerized styrene block and a polymerized conjugated diene block, wherein at least one polymerized styrene block has a number average molecular weight of 15,000 or more. By the hydrogenation of the non-hydrogenated block copolymer, the unsaturation degree of the polymerized conjugated diene block is lowered generally to 40% or less, preferably to 20% or less. The hydrogenated block copolymer (C) can be produced by a conventional method. Examples of such conventional methods include methods which are disclosed in Unexamined Japanese Patent Application Laid-Open Specification Nos. Sho 47-11486, Sho 49-66743, Sho 50-75651, Sho 54-126255, Sho 56-10542, Sho 56-62847 and Sho 56-100840, GB Patent No. 1130770, U.S. Pat. Nos. 3,281,383 and 3,639,517, GB Patent No. 1020720, and U.S. Pat. Nos. 3,333,024 and 4,501,857.

The hydrogenated block copolymer is produced by hydrogenating a non-hydrogenated block copolymer comprising a polymerized styrene block X and a polymerized conjugated diene block Y, wherein the hydrogenation is effected with respect to the block Y. Examples of non-hydrogenated block copolymers include styrene-conjugated diene block copolymers having block configurations represented by the formulae: X—Y—X, X—Y—X—Y, (X—Y—)$_4$—Si and X—Y—X—Y—X. As a preferred example of a conjugated diene, there can be mentioned butadiene. With respect to the microstructure of the polymerized conjugated diene block, there is no particular limitation. However, with respect to the 1,2-vinyl bond content of the polymerized conjugated diene block, the content is generally from 2 to 60%, preferably from 8 to 40%.

It is required that, in the non-hydrogenated block copolymer, at least one polymerized styrene block have a number average molecular weight of 15,000 or more. It is preferred that at least one polymerized styrene block has a number average molecular weight of 20,000 or more. It is more preferred that the or each polymerized styrene block in the non-hydrogenated block copolymer has a number average molecular weight of 15,000 or more.

In the present invention, the molecular weight is determined by gel permeation chromatography (GPC) using a calibration curve obtained with respect to standard monodisperse polystyrene samples having predetermined molecular weights, wherein tetrahydrofuran is used as a solvent. The number average molecular weight of the or each polymerized styrene block can be obtained as follows. The number average molecular weight of the hydrogenated block copolymer is measured by GPC using a calibration curve obtained with respect to standard monodisperse polystyrene samples. Then, the number average molecular weight of the or each polymerized styrene block is calculated from the above-obtained number average molecular weight of the hydrogenated block copolymer in terms of a non-hydrogenated form thereof and the weight ratio of the or each polymerized styrene block to the non-hydrogenated block copolymer.

In the non-hydrogenated block copolymer, the weight ratio of the polymerized styrene block to the polymerized conjugated diene block (preferably polymerized butadiene block), the number of the polymerized conjugated diene block(s) and the number average molecular weight of the or each polymerized conjugated diene block are not specifically limited so long as at least one polymerized styrene block in the non-hydrogenated block copolymer has a number average molecular weight of 15,000 or more. However, the amount of the polymerized styrene block in the non-hydrogenated block copolymer is preferably from 25 to 80% by weight, more preferably from 40 to 70% by weight (namely, 60 to 30% by weight with respect to the amount of the polymerized conjugated diene block), based on the total weight of the polymerized styrene block and the polymerized conjugated diene block (preferably polymerized butadiene block).

In the present invention, the number average molecular weight of the hydrogenated block copolymer (C) is generally in the range of from 40,000 to 500,000, preferably from 60,000 to 300,000.

As the polyolefin resin (D) used in the present invention, there can be used a polyolefin resin having an MFR (melt flow rate) of from 0.1 to 50 g/10 min, preferably from 0.2 to 20 g/10 min, as measured at 190° C. under a load of 2.16 kg in accordance with ASTM D-1238. Examples of polyolefin resins (D) used in the present invention include polyethylene, such as a low density polyethylene, a high density polyethylene or a linear, low density polyethylene; polypropylene; an ethylene-propylene copolymer; and an ethylene-butene copolymer. Of these polyolefin resins, a low density polyethylene and an ethylene-propylene copolymer are preferred.

Each of an ethylene-propylene copolymer and an ethylene-butene copolymer is generally a non-crystalline or low crystalline copolymer. Each of these copolymers may have a third component copolymerized thereinto so long as the performance of the copolymer is not adversely affected. In the copolymer, the ethylene monomer unit/propylene monomer unit ratio or the ethylene monomer unit/butene monomer unit ratio is not specifically limited. However, the content of the propylene monomer unit or butene monomer unit in the copolymer is generally in the range of from 5 to 50 mol %. These copolymers are generally commercially available. As an example of such commercially available copolymer, there can be mentioned Tafmer (trade name; manufactured and sold by Mitsui Chemicals, Inc., Japan).

The above-mentioned olefin resins can be used individually or in combination.

The essential feature of the present invention resides in that a specific amount of a specific hydrogenated block copolymer as the component (C) and a specific amount of a specific polyolefin resin as the component (D) are incorporated into a polyphenylene ether resin which is caused to have flame retardancy by incorporating thereinto a condensed phosphoric ester.

The polyphenylene ether composition of the present invention contains 0.3 to 10 parts by weight of the hydrogenated block copolymer (C) and 0.3 to 10 parts by weight of the polyolefin resin (D), wherein, as mentioned above, the hydrogenated block copolymer (C) is defined as a hydrogenation product of a block copolymer comprising a polymerized styrene block and a polymerized conjugated diene block, wherein at least one polymerized styrene block has a number average molecular weight of 15,000 or more. It is preferred that the amounts of the hydrogenated block copolymer (C) and the polyolefin resin (D) are, respectively, from 0.5 to 5 parts by weight and from 0.5 to 5 parts by weight, relative to 100 parts by weight of the component (A). It is more preferred that the amounts of the hydrogenated block copolymer (C) and the polyolefin resin (D) are, respectively, from 0.5 to 3 parts by weight and from 0.5 to 4 parts by weight, relative to 100 parts by weight of the component (A). When the amount of the component (C) or (D) is more than 10 parts by weight, disadvantages are likely to occur not only in that the excellent mechanical characteristics (such as tensile strength, flexural strength and flexural modulus) which have been achieved by the use of a combination of the polyphenylene ether resin and the condensed phosphoric ester are impaired, but also in that the flame retardancy of the polyphenylene ether composition is adversely affected. On the other hand, when the amount of the component (C) or (D) is less than 0.3 part by weight, it is virtually impossible to improve the impact resistance, mold release characteristics and chemicals resistance of the polyphenylene ether composition.

In the present invention, the weight ratio of the hydrogenated block copolymer (C) to the polyolefin resin (D) is 70/30 to 15/85. However, from the viewpoint of remarkably improving the impact resistance, it is preferred that the weight ratio of the hydrogenated block copolymer (C) to the polyolefin resin (D) is from 60/40 to 15/85, more advantageously from 55/45 to 25/75, still more advantageously from 50/50 to 30/70. When the amount of the polyolefin resin (D) is less than 30 parts by weight or more than 85 parts by weight, relative to 100 parts by weight of the total of the components (C) and (D), the impact resistance, peeling resistance, mold release characteristics and chemicals resistance of the composition are likely to be poor.

By incorporating an inorganic filler (such as a glass fiber, a glass flake, kaolin clay or talc) or a fibrous reinforcing agent other than mentioned above into the polyolefin ether composition of the present invention, a high strength composite having excellent fluidity and heat resistance can be obtained.

For the propose of imparting a property other than mentioned above to the polyphenylene ether composition of the present invention, the composition may contain an additive other than mentioned above, so long as the essential effect of the present invention is not impaired. Examples of additives other than mentioned above include a plasticizer, an antioxidant, a stabilizer (such as an ultraviolet absorber), an antistatic agent, a mold release agent, a dye, a pigment and other resins. The additive is used in an amount which is conventionally used. For the purpose of further improving the flame retardancy of the polyphenylene ether composition of the present invention, the resin composition may contain at least one member selected from the group consisting of conventional flame retardants and auxiliary flame retardants. Examples of such flame retardants and auxiliary flame retardants include magnesium hydroxide containing water of crystallization, aluminum hydroxide containing water of crystallization, zinc borate compounds, zinc stannate compounds, and inorganic silicon compounds, such as silica, kaolin clay and talc.

With respect to the method for producing the polyphenylene ether composition of the present invention, there is no particular limitation. For example, the polyphenylene ether composition can be produced by kneading a mixture of the components of the composition using a kneader, such as an extruder, a heating roll, a kneader or a Banbury mixer. From the viewpoint of productivity, it is preferred that the kneading of the mixture is conducted using an extruder. The temperature employed for kneading the mixture can be chosen according to the temperature at which the molding of the base resin (i.e., polyphenylene ether resin (A)) is preferably conducted. The kneading temperature is generally in the range of from 200 to 360° C., preferably from 240 to 320° C.

BEST MODE FOR CARRYING OUT THE INVENTION

Hereinbelow, the present invention will be described in more detail with reference to the following Examples and Comparative Examples, which should not be construed as limiting the scope of the present invention.

The components used in the Examples and Comparative Examples are as follows.

(A-1) Polyphenylene ether resin:
(PPE-1) poly(2,6-dimethyl-1,4-phenylene) ether which has an $\eta_{sp}/c$ of 0.51 as measured using a chloroform solution thereof having a temperature of 30° C., and has a weight average molecular weight/number average molecular weight ratio (Mw/Mn ratio) of 2.8; and (PPE-2) poly(2,6-dimethyl-1,4-phenylene) ether which has an $\eta_{sp}/c$ of 0.53 as measured using a chloroform solution thereof having a temperature of 30° C., and has a weight average molecular weight/number average molecular weight ratio (Mw/Mn ratio) of 2.1.

(A-2) Styrene resin:

(HIPS) a rubber-modified polystyrene comprising a matrix polystyrene and a rubber component, wherein the rubber component content is 9%, the matrix polystyrene has an $\eta_{sp}/c$ of 0.70 as measured using a toluene solution thereof having a temperature of 30° C., and the volume average rubber particle diameter is 1.5 μm.

(B) Flame retardant:

(FR-1) a condensed phosphoric ester (trade name: CR-741; manufactured and sold by Daihachi Chemical Industry Co., Ltd., Japan) which has an acid value of 0.05 and is comprised mainly of bisdiphenyl phosphate (n=1) of bisphenol A represented by the below-described formula (V) and contains small amounts of bisdiphenyl phosphate (n=2 or 3) of bisphenol A and triphenyl-phosphate (i.e., below-described compound (F-3)):

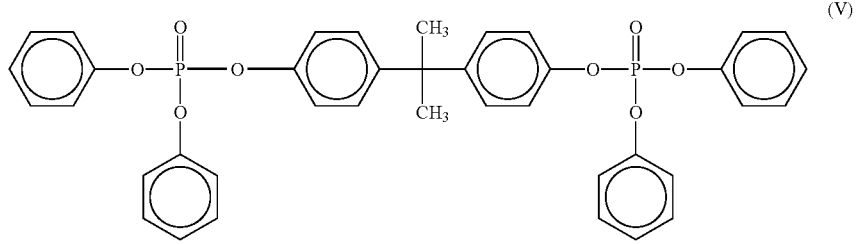

(V)

(FR-2) a condensed phosphoric ester (trade name: PX-200; manufactured and sold by Daihachi Chemical Industry Co., Ltd., Japan) which has an acid value of 0.2 and is comprised mainly of bisdixylenyl phosphate (n=1) of resorcinol represented by the below-described formula (VI) and contains small amounts of bisdiphenyl phosphate (n=2 or 3) of resorcinol and tricresyl phosphate):

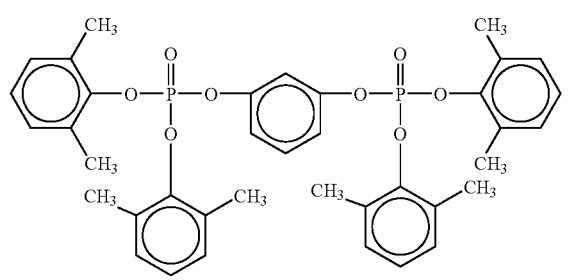

(VI)

(FR-3: comparative flame retardant) triphenyl phosphate represented by the following formula (VII) (trade name: TPP; manufactured and sold by Daihachi Chemical Industry Co., Ltd., Japan):

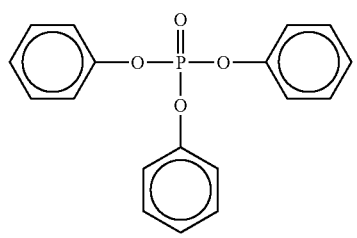

(VII)

(FR-4) a condensed phosphoric ester (trade name: CR-733S; manufactured and sold by Daihachi Chemical Industry Co., Ltd., Japan) which has an acid value of 0.06 and is comprised mainly of bisdiphenyl phosphate (n=1) of resorcinol represented by the following formula (VIII) and contains small amounts of bisdiphenyl phosphate (n=2 or 3) of resorcinol and triphenyl phosphate (i.e., above-described compound (FR-3))

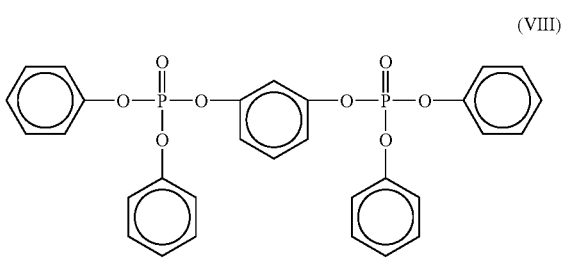

(VIII)

(C) Hydrogenated block copolymer (HSB):

(HSB-1) a hydrogenation product of a styrene-butadiene block copolymer which contains two polymerized styrene blocks each having a number average molecular weight of about 24,000 and which has a 1,2-vinyl bond content of 36%, wherein the hydrogenation product has a number average molecular weight of about 80,000;

(HSB-2) an oil-extended rubber which is comprised of a paraffin hydrocarbon having a molecular weight of about 800 and a hydrogenation product of a styrene-butadiene block copolymer and which has a paraffin hydrocarbon content of 35%, wherein the styrene-butadiene block copolymer has a 1,2-vinyl bond content of 35% and contains two polymerized styrene blocks having number average molecular weights of about 27,000 and 32,000, respectively, and wherein the hydrogenation product of the styrene-butadiene block copolymer has a number average molecular weight of about 170,000;

(HSB-3) a hydrogenation product of a styrene-butadiene block copolymer which contains two polymerized styrene blocks each having a number average molecular weight of about 10,000 and which has a 1,2-vinyl bond content of 36%, wherein the hydrogenation product has a number average molecular weight of about 50,000; and (HSB-4) a hydrogenation product of a styrene-butadiene block copolymer which contains two polymerized styrene blocks having a number average molecular weight of about 8,000 and 7,000, respectively, and which has a 1,2-vinyl bond content of 41%, wherein the hydrogenation product has a number average molecular weight of about 43,000.

(D) Polyolefin resin:

(LDPE-1) a low density polyethylene having an MFR of 20 g/10 min as measured at 190° C. under a load of 2.16 kg in accordance with ASTM D-1238;

(LDPE-2) a low density polyethylene having an MFR of 0.4 g/10 min as measured at 190° C. under a load of 2.16 kg in accordance with ASTM D-1238;

(HDPE) a high density polyethylene having an MFR of 1.3 g/10 min as measured at 190° C. under a load of 2.16 kg in accordance with ASTM D-1238;

(LLDPE) a linear, low density polyethylene having an MFR of 1.2 g/10 min as measured at 190° C. under a load of 2.16 kg in accordance with ASTM D-1238;

(PP) a polypropylene having an MFR of 1.5 g/10 min as measured at 190° C. under a load of 2.16 kg in accordance with ASTM D-1238;

(EP-1) an ethylene-propylene copolymer (trade name: Tafmer® P-0280; manufactured and sold by Mitsui Chemicals, Inc., Japan) which has an MFR of 2.9 g/10 min as measured at 190° C. in accordance with ASTM D-1238;

(EP-2) an ethylene-propylene copolymer (trade name: Tafmer® P-0680; manufactured and sold by Mitsui Chemicals, Inc., Japan) which has an MFR of 2.9 g/10 min as measured at 190° C. in accordance with ASTM D-1238; and (EB-1) an ethylene-butene copolymer (trade name: Tafmer® TX 610; manufactured and sold by Mitsui Chemicals, Inc., Japan) which has an MFR of 0.5 g/10 min as measured at 190° C. in accordance with ASTM D-1238.

Properties of compositions produced in the Examples and Comparative Examples were measured and evaluated by the following methods.

(1) Izod impact strength (notched Izod impact strength)

The Izod impact strength was measured in accordance with ASTM D-256.

(2) Tensile strength

The tensile strength was measured in accordance with ASTM D-638.

(3) Flame retardancy

A burning test was conducted with respect to an injection-molded test specimen having a thickness of 1/16 inch in accordance with the vertical burning method which is described in UL-94. The burning period of time (i.e., period of time for which the test specimen was burned) was measured, and it was examined whether or not dripping of flaming particles during the burning of the test specimen occurred. The test was conducted 10 times. The evaluation of the flame retardancy was made from the measurement of the total of the ten burning periods of time and from the above-mentioned examination as to whether or not dripping of flaming particles occurred.

(4) Heat resistance (deflection temperature under load)

The deflection temperature under load was measured under a pressure of 1.82 MPa in accordance with ASTM D-648.

(5) Fluidity (melt flow rate)

The melt flow rate was measured at 250° C. under a load of 10 kg in accordance with ASTM D-1238.

(6) Mold release characteristics

During the production of a test specimen by an injection molding, the degree of easiness in the release of the test specimen and a runner from the mold was visually observed. The mold release characteristics were evaluated by the following criteria:

○: It is easy to release the test specimen and runner from the mold.

Δ: It is slightly difficult to release the test specimen and runner from the mold.

X: It is very difficult to release the test specimen and runner from the mold.

(7) Peeling resistance

A tensile test specimen having a thickness of 1/8 inch was produced by injection molding in accordance with ASTM D-638. The test specimen was repeatedly folded. Then, the degree of surface peeling of the test specimen caused by the folding of the test specimen was visually observed and evaluated by the following criteria:

○: Almost no surface peeling is observed.

Δ: Slight surface peeling is observed.

X: Marked surface peeling is observed.

(8) Chemicals Resistance

In accordance with ASTM D-638, a test specimen having a thickness of 1/8 inch was produced and the ordinary tensile strength (TSa) of the test specimen was measured. Also, another test specimen having a thickness of 1/8 inch was produced in accordance with ASTM D-638 and, using this test specimen, another tensile strength was measured as follows. The test specimen was held on a bar having a shape of an arc having a surface distortion of 1%. The bar having the specimen held thereon was immersed in a chemical reagent (a liquid mixture comprising 60% by weight of isopropyl alcohol and 40% by weight of cyclohexane) for 30 minutes. With respect to the resultant test specimen, the tensile strength (TSb) was measured. The tensile strength retention is defined as the ratio (%) of tensile strength (TSb) to tensile strength (TSa).

(9) Generation of gas

A resin composition was subjected to blank injection molding test. The amount of a gas (white smoke) generated from the molten resin composition during the blank injection molding test was visually observed and evaluated by the following criteria:

○: The amount of white smoke is small.

X: The amount of white smoke is large.

(10) Black-Colored Impurity

With respect to a tabular test specimen having a size of 50 mm×90 mm×2.5 mm (thickness), the amount of a black-colored impurity present therein was visually observed.

(11) Water absorption test

In an autoclave, a test specimen having a thickness of 1/8 inch produced in accordance with ASTM D-638 was exposed to steam having a temperature of 120° C. under superatmospheric pressure for 96 hours. The increase in weight of the test specimen by the exposure thereof to steam for 96 hours was measured. Further, with respect to the specimen which had undergone the exposure to steam for 96 hours, the Izod impact strength and tensile strength thereof were measured.

EXAMPLES 1 to 23 and COMPARATIVE EXAMPLES 1 to 17

In each of Examples 1 to 23 and Comparative Examples 1 to 17, components as shown in Tables 1 to 6 and tris(2,4-di-t-butylphenyl) phosphite as a stabilizer were mixed together, wherein the amounts of the components were as shown in Tables 1 to 6, and the amount of tris(2,4-di-t-butylphenyl) phosphite was 0.3 part by weight. The resultant mixture was fed into a twin-screw extruder equipped with a screw having a diameter of 25 mm, wherein the maximum cylinder temperature of the heating cylinder was preset at 320° C. Then, the mixture was melt-kneaded under conditions wherein the revolution rate of the screw was 300 rpm and the extrusion rate was 15 kg/hr, thereby extruding a strand from the extruder. The strand was cooled and cut into pieces, thereby obtaining a resin composition in the form of pellets. The obtained resin composition pellets were subjected to injection molding at 240 to 290° C., thereby obtaining test specimens. Using the obtained test specimens, properties of the resin composition were measured and evaluated by the above-mentioned methods. The results are shown in Tables 1 to 6.

TABLE 1

|  | Examples | | | | Comparative Examples | | | | |
|---|---|---|---|---|---|---|---|---|---|
|  | 1 | 2 | 3 | 4 | 1 | 2 | 3 | 4 | 5 |
| (Formulation: parts by weight) | | | | | | | | | |
| PPE-1 | 68 | 68 | 68 | 68 | 68 | 68 | 68 | 68 | 68 |
| HIPS | 32 | 32 | 32 | 32 | 32 | 32 | 32 | 32 | 32 |
| FR-1 | 20 | 20 | 20 | 20 | 20 | 20 | 20 | 20 | 20 |
| HSB-1 | 2.4 | 2.0 | 1.5 | 1.0 |  | 4.0 |  | 3.0 | 0.5 |
| LDPE-1 | 1.6 | 2.0 | 2.5 | 3.0 |  |  | 4.0 | 1.0 | 3.5 |
| (Properties) | | | | | | | | | |
| Izod impact strength (kg · cm/cm) | 10 | 12 | 14 | 13 | 7 | 7 | 6 | 7 | 7 |
| Peeling resistance | ○ | ○ | ○ | ○ | ○ | ○ | X | ○ | X |
| Mold release characteristics | Δ | ○ | ○ | ○ | X | X | ○ | X | ○ |
| Chemicals resistance (%) | 35 | 40 | 45 | 42 | 20 | 25 | 0 | 25 | 0 |

TABLE 2

|  | Examples | | | | Comparative Examples | | | |
|---|---|---|---|---|---|---|---|---|
|  | 5 | 6 | 7 | 8 | 6 | 7 | 8 | 9 |
| (Formulation: parts by weight) | | | | | | | | |
| PPE-1 | 68 | 68 | 68 | 68 | 68 | 68 | 68 | 68 |
| HIPS | 32 | 32 | 32 | 32 | 32 | 32 | 32 | 32 |
| FR-1 | 20 | 22 | 22 | 22 | 22 | 22 | 22 | 22 |
| HSB-1 | 2.4 | 2.0 | 1.5 | 1.0 | 4.0 |  | 3.0 | 0.5 |
| EP-1 | 1.6 | 2.0 | 2.5 | 3.0 |  | 4.0 | 1.0 | 3.5 |
| (Properties) | | | | | | | | |
| Izod impact strength (kg · cm/cm) | 11 | 13 | 15 | 14 | 7 | 6 | 7 | 7 |
| Flame retardancy | V-0 | V-0 | V-0 | V-0 | V-0 | V-0 | V-0 | V-0 |
| Peeling resistance | ○ | ○ | ○ | ○ | ○ | X | ○ | X |
| Mold release characteristics | ○ | ○ | ○ | ○ | X | ○ | X | ○ |
| Chemicals resistance (%) | 32 | 40 | 42 | 45 | 25 | 0 | 26 | 0 |

TABLE 3

|  | Examples | | | | | Comparative Examples | | |
|---|---|---|---|---|---|---|---|---|
|  | 9 | 10 | 11 | 12 | 13 | 10 | 11 | 12 |
| (Formulation: parts by weight) | | | | | | | | |
| PPE-1 | 75 | 75 | 75 | 75 | 75 | 75 | 75 | 75 |
| HIPS | 25 | 25 | 25 | 25 | 25 | 25 | 25 | 25 |
| FR-1 | 15 | 15 | 15 | 15 | 15 | 15 | 15 | 15 |
| HSB-1 | 1.5 | 1.5 | 1.5 | 1.5 |  |  |  |  |
| HSB-2 |  |  |  |  | 1.5 |  |  |  |
| HSB-3 |  |  |  |  |  | 3.5 | 1.5 |  |
| HSB-4 |  |  |  |  |  |  |  | 1.5 |
| LDPE-1 | 2.0 |  |  |  | 2.0 |  | 2.0 | 2.0 |
| LDPE-2 |  | 2.0 |  |  |  |  |  |  |
| LLDPE |  |  | 2.0 |  |  |  |  |  |
| PP |  |  |  | 2.0 |  |  |  |  |

TABLE 3-continued

|  | Examples | | | | | Comparative Examples | | |
|---|---|---|---|---|---|---|---|---|
|  | 9 | 10 | 11 | 12 | 13 | 10 | 11 | 12 |
| (Properties) | | | | | | | | |
| Izod impact strength (kg · cm/cm) | 14 | 14 | 13 | 12 | 16 | 10 | 10 | 7 |
| Peeling resistance | ○ | ○ | ○ | ○ | ○ | ○ | X | X |
| Mold release characteristics | ○ | ○ | ○ | ○ | ○ | X | ○ | ○ |

TABLE 4

|  | Examples | | | |
|---|---|---|---|---|
|  | 14 | 15 | 16 | 17 |
| (Formulation: parts by weight) | | | | |
| PPE-1 | 75 | 75 | 75 | 75 |
| HIPS | 25 | 25 | 25 | 25 |
| FR-1 | 15 | 15 | 15 | 15 |
| HSB-1 | 1.5 | 1.5 | 1.5 | |
| HSB-2 | | | | 1.5 |
| EP-1 | 2.0 | | | 2.0 |
| EP-2 | | 2.0 | | |
| EB-1 | | | 2.0 | |
| (Properties) | | | | |
| Izod impact strength (kg · cm/cm) | 15 | 16 | 16 | 17 |
| Peeling resistance | ○ | ○ | ○ | ○ |
| Mold release characteristics | ○ | ○ | ○ | ○ |

TABLE 5

|  | Examples | | | Comparative Examples | | | | |
|---|---|---|---|---|---|---|---|---|
|  | 18 | 19 | 20 | 13 | 14 | 15 | 16 | 17 |
| (Formulation: parts by weight) | | | | | | | | |
| PPE-1 | 80 | 60 | 60 | 80 | 60 | 60 | 55 | 55 |
| HIPS | 20 | 40 | 40 | 20 | 40 | 40 | 45 | 45 |
| FR-1 | 10 | 24 | | 10 | 24 | 24 | | |
| FR-2 | | | 24 | | | | | |
| FR-3 | | | | | | | 14 | 14 |
| HSB-1 | 1.5 | 1.5 | 1.5 | | | | | |
| HSB-3 | | | | 3.5 | | 3.5 | | 3.5 |
| LDPE-1 | 2.0 | 2.0 | 2.0 | | | | | |
| (Properties) | | | | | | | | |
| Izod impact strength (kg · cm/cm) | 14 | 13 | 12 | 9 | 7 | 9 | 12 | 14 |
| Peeling resistance | ○ | ○ | ○ | ○ | ○ | ○ | ○ | ○ |
| Flame retardancy | V-0 | V-0 | V-0 | V-0 | V-0 | V-0 | V-0 | V-0 |
| Heat resistance (° C.) | 130 | 90 | 90 | 130 | 90 | 90 | 90 | 90 |
| Generation of gas | ○ | ○ | ○ | ○ | ○ | ○ | X | X |

TABLE 6

|  | Examples | | |
|---|---|---|---|
|  | 21 | 22 | 23 |
| (Formulation: parts by weight) | | | |
| PPE-1 | 80 | 60 | |
| PPE-2 | | | 60 |
| HIPS | 20 | 40 | 40 |
| FR-1 | 10 | 24 | 24 |
| HSB-1 | 1.5 | 1.5 | 1.5 |
| EP-1 | 2.0 | 2.0 | 2.0 |
| (Properties) | | | |
| Izod impact strength (kg · cm/cm) | 15 | 14 | 16 |
| Peeling resistance | ○ | ○ | ○ |
| Flame retardancy | V-0 | V-0 | V-0 |
| Heat resistance (° C.) | 130 | 90 | 90 |
| Fluidity (g/10 min) | | 34 | 24 |
| Generation of gas | ○ | ○ | ○ |

EXAMPLES 24 and 25

In each of Examples 24 and 25, a strand of a polyphenylene ether composition was extruded using a twin-screw extruder having a screw diameter of 40 mm and an L/D of 46 under conditions wherein the maximum cylinder temperature of the heating cylinder was preset at 320° C., the revolution rate of the screw was 300 rpm and the extrusion rate was 100 kg/hr. The extruded strand was cooled and cut into pieces, thereby producing a polyphenylene ether composition in the form of pellets. In the production of the polyphenylene ether composition pellets, components as shown in Table 7 and tris(2,4-di-t-butylphenyl) phosphite as a stabilizer were fed to the extruder, wherein the amounts of the components were as shown in Table 7 and the amount of tris(2,4-di-t-butylphenyl) phosphite was 0.3 part by weight, and wherein the flame retardant was fed to the extruder through an inlet provided at a portion of a barrel of the extruder and the components other than the flame retardant were fed to the extruder through a hopper of the extruder. In each of Examples 24 and 25, the extruder was operated for 2 hours or more, and 5 kg of the resin composition pellets obtained after 2 hours of operation of the extruder were used as samples for evaluating the properties of the resin composition. The resin composition pellets obtained by the above-mentioned extrusion molding was subjected to injection molding at 290° C., thereby obtaining test specimens. Using the obtained test specimens, the properties of the polyphenylene ether composition were measured and evaluated by the above-mentioned methods. The results are shown in Table 7.

In the polyphenylene ether composition produced in Example 24 in which the condensed phosphoric ester (FR-1) comprised mainly of bisdiphenyl phosphate of bisphenol A was used, the amount of a black-colored impurity (which is likely to be generated when the composition has poor heat stability) is small, as compared to the case of the polyphenylene ether composition produced in Example 25 in which the condensed phosphoric ester (FR-4) comprised mainly of bisdiphenyl phosphate of resorcinol was used. Also, in the composition produced in Example 24, the weight increase ratio (%) of the composition (wherein the weight increase ratio was measured by the above-mentioned water absorption test) is markedly small, as compared to the case of the composition produced in Example 25. Further, in the composition produced in Example 24, the lowering of mechanical strength is small, as compared to the case of the composition produced in Example 25. It is considered that the composition (produced in Example 24) which has a markedly small water absorption weight increase ratio exhibits excellent dielectric properties, such as dielectric loss tangent, as compared to those of the composition produced (in Example 25) which has a large water absorption weight increase ratio.

TABLE 7

|  |  | Examples | |
|---|---|---|---|
|  |  | 24 | 25 |
| (Formulation: parts by weight) | | | |
|  | PPE | 77 | 75 |
|  | HIPS | 23 | 25 |
|  | FR-1 | 14.5 | |
|  | FR-4 | | 11.5 |
|  | HSB-2 | 2.3 | 2.3 |
|  | LDPE-1 | 2.3 | 2.3 |
| Properties of the composition before water absorption | Amount of a black-colored impurity | small | large |
|  | Heat resistance (° C.) | 118 | 119 |
|  | Izod impact strength (kg · cm/cm) | 13.2 | 15.9 |
|  | Tensile strength (kg/cm²) | 668 | 643 |
|  | Melt flow rate (g/10 min) | 6.1 | 5.3 |
| Properties of the composition after water absorption | Weight increase ratio (weight %) | 1.2 | 10.0 |
|  | Izod impact strength (kg · cm/cm) | 14.8 | 12.8 |
|  | (retention ratio (%)) | (112%) | (67%) |
|  | Tensile strength (kg/cm²) | 701 | 564 |
|  | (retention ratio (%)) | (105%) | (88%) |

INDUSTRIAL APPLICABILITY

The polyphenylene ether composition of the present invention is friendly to the environment because the polyphenylene ether composition contains neither a halogen compound nor an antimony compound as a flame retardant. Also, the polyphenylene ether composition of the present invention retains good heat resistance, mechanical characteristics and dielectric properties which are inherently possessed by a polyphenylene ether resin. Further, the polyphenylene ether composition of the present invention, in the injection molding thereof, has excellent mold release characteristics and is substantially free from generation of a gas and from adhesion of the flame retardant contained therein to the mold, so that the molding cycle time of the polyphenylene ether composition can be shortened. Furthermore, the polyphenylene ether composition of the present invention also has excellent chemicals resistance and excellent impact resistance.

By adjusting the heat resistance and flame retardancy of the polyphenylene ether composition of the present invention to a desired level, the polyphenylene ether composition of the present invention can be advantageously used in application fields in which good heat resistance, flame retardancy and dielectric properties are required. For example, the polyphenylene ether composition of the present invention can be used as materials for articles, such as housings of electric appliances, and electric and electronic components which are used in the above-mentioned application fields. Further, in order for the above-mentioned articles to be light in weight and also to be thin-walled, the polyphenylene ether composition of the present invention can be advantageously used.

The invention claimed is:

1. A polyphenylene ether composition comprising:
   100 parts by weight of (A) a combination of a polyphenylene ether resin and a styrene resin, wherein the weight ratio of said polyphenylene ether resin to said styrene resin is from 30/70 to 80/20,
   1 to 40 parts by weight of (B) a flame retardant which is comprised mainly of a condensed phosphoric ester (I) represented by the following formula (I):

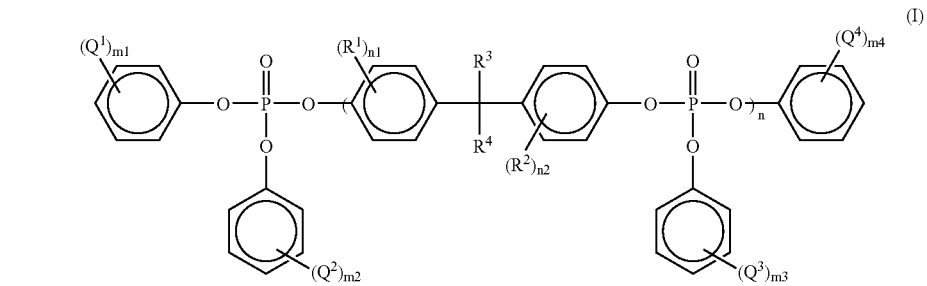

wherein each of $Q^1$, $Q^2$, $Q^3$ and $Q^4$ is a substituent and independently represents an alkyl group having 1 to 6 carbon atoms; each of $R^1$ and $R^2$ is a substituent and represents a methyl group; each of $R^3$ and $R^4$ independently represents a hydrogen atom or a methyl group; n has an average value of 1 or more; each of n1 and n2 independently represents an integer of from 0 to 2; and each of m1, m2, m3 and m4 independently represents an integer of from 0 to 3, 0.5 to 3 parts by weight of (C) a hydrogenated block copolymer which is defined as a hydrogenation product of a block copolymer comprising a polymerized styrene block and a polymerized conjugated diene block, wherein at least one polymerized styrene block has a number average molecular weight of more than 20,000, and 0.5 to 4 parts by weight of (D) a polyolefin resin, wherein the weight ratio of said component (C) to said component (D) is from 70/30 to 15/85.

2. The polyphenylene ether composition according to claim 1, wherein said flame retardant (B) has an acid value of 0.1 or less.

3. The polyphenylene ether composition according to claim 1 or claim 2, wherein the weight ratio of said component (C) to said component (D) is from 55/45 to 25/75.

4. The polyphenylene ether composition according to claim 1 or claim 2, wherein said hydrogenated block copolymer (C), in terms of a non-hydrogenated form thereof, comprises a polymerized styrene block and a polymerized butadiene block, wherein the weight ratio of said polymerized styrene block to said polymerized butadiene block is from 40/60 to 70/30.

5. The polyphenylene ether composition according to claim 1 or claim 2, wherein said polyolefin resin (D) is a polyethylene.

6. The polyphenylene ether composition according to claim 1 or claim 2, wherein said polyolefin resin (D) is a low density polyethylene.

7. The polyphenylene ether composition according to claim 1 or claim 2, wherein said polyolefin resin (D) is an ethylene-propylene copolymer.

8. The polyphenylene ether composition according to claim 1 or claim 2, wherein said polyphenylene ether resin contained in said component (A) is poly(2,6-dimethyl-1,4-phenylene) ether which has an $\eta_{sp}/c$ of from 0.3 to 0.7 as measured using a chloroform solution thereof having a temperature of 30° C., and has an Mw/Mn ratio of from 2.2 to 5.0, wherein Mw is the weight average molecular weight of the poly(2,6-dimethyl-1,4-phenylene) ether and Mn is the number average molecular weight of the poly(2,6-dimethyl-1,4-phenylene) ether and wherein each of the Mw and Mn is determined by gel permeation chromatogaphy (GPC) using a calibration curve obtained with respect to standard monodisperse polystyrene samples.

* * * * *